(No Model.)

E. KUHN.
PATTERN FOR MOLDING DOVETAILS.

No. 492,728. Patented Feb. 28, 1893.

WITNESSES_
Geo. E. Freech.
Rob. A. Fitzgerald.

INVENTOR_
Edmund Kuhn
per
Lehmann Pattison & Nesbit
Atty's

UNITED STATES PATENT OFFICE.

EDMUND KUHN, OF NEW ALBANY, INDIANA.

PATTERN FOR MOLDING DOVETAILS.

SPECIFICATION forming part of Letters Patent No. 492,728, dated February 28, 1893.

Application filed September 29, 1892. Serial No. 447,299. (No model.)

*To all whom it may concern:*

Be it known that I, EDMUND KUHN, of New Albany, in the county of Floyd and State of Indiana, have invented certain new and useful Improvements in Patterns for Molding Dovetails; and I do hereby declare the following to be a full, clear, and exact description of the invention, such as will enable others skilled in the art to which it pertains to make and use it, reference being had to the accompanying drawings, which form part of this specification.

My invention relates to improvements in patterns for molding dove-tails; and it consists in the particular construction hereinafter fully described, and particularly referred to in the claims.

The object of my invention is to provide a pattern with a removable shell of the construction hereinafter shown and described, whereby a perfect mold can be made, and the breaking of the sand prevented when the upper portion of the flask is removed.

Figure 1:
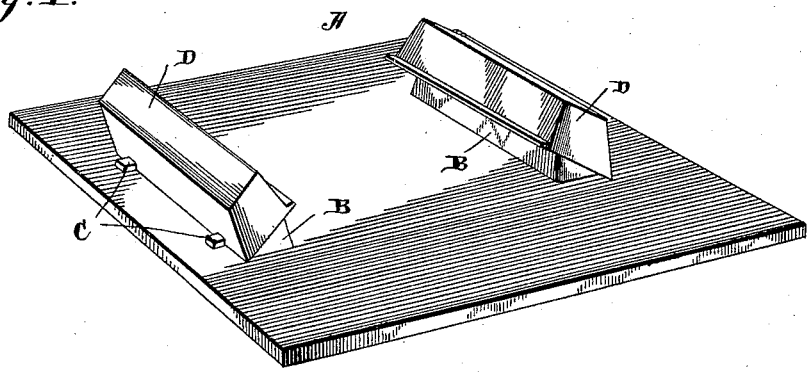
Figure 2:
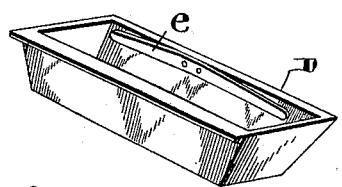
Figure 3:
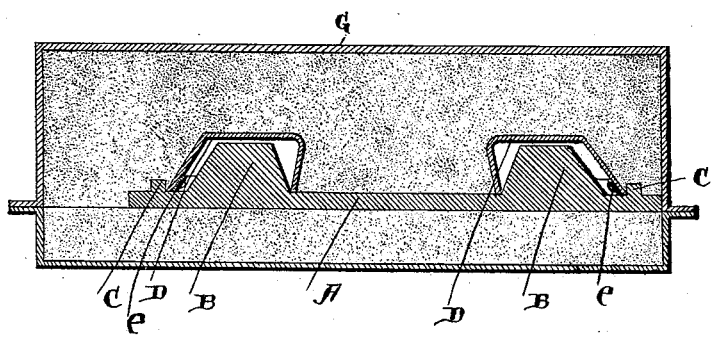

Figure 1 is a perspective view of a pattern which embodies my invention complete, the shells being shown in the position automatically assumed by them when the flask is being separated. Fig. 2 is a perspective view of the interior of one of the shells. Fig. 3 is a sectional view showing the pattern in position in the flask.

G indicates a flask which is of any of the ordinary constructions, and which is made of an upper and lower part as usual.

A indicates that part of the bottom of a stove at the point where the dove-tails for the feet are situated, and this portion is provided with the two projections or cleats B, which have inclined outer and inner sides as illustrated, the outer side being at an angle much greater than the inner side. Near the outer edges of these projections or cleats, are the steady pins C, of which there are two for each projection. These steady pins are for the purpose of holding and steadying the shells D, in their proper relation to the projections, by placing the outer edges thereof between the pins and the outer edge of the projections as clearly shown. Placed within these shells are the springs *e*, which are preferably riveted to the inner sides thereof. When the shells are placed upon the cleats, the springs normally force them in the position shown in Fig. 1. Instead however, of placing these springs within the shells and securing them thereto, they can be attached to the cleats, and their ends engage the shells, thus producing the same result, though I prefer to attach them to the shells for convenience in construction. These shells are of course provided with outer inclined sides, so as to make the shape of a dove-tail, as will be understood. The outer edges of the cleats are made inclined to allow the springs between them and the shells, the incline thereof being at a greater angle than the inclines of the shells to permit it. So also the inner sides of the cleats are cut at an incline to allow the shells to be freely forced up by the springs without any binding action.

In operation, the lower portion of the flask is filled with sand, and the portion A placed thereon. The shells are next placed upon the cleats in the position shown, and are held down with the fingers until sufficient sand is packed thereon to hold them firmly in place. After sufficient sand has been packed therein to form a mold, the upper portion of the flask is removed. When this is being removed, the shells are automatically thrown up to allow them to fall out of the cavities formed therein, and the pins hold them steady to place. Owing to this construction, the upper part of the flask is removed without breaking the sand at the edges or walls of the cavities formed by the shells, and the shells held steady to prevent the same undesirable result.

Having thus described my invention, what I claim, and desire to secure by Letters Patent, is—

1. A dove-tail mold pattern, consisting of a base portion having cleats, steady pins at the outer sides thereof, and shells placed over the cleats with their outer edges between the cleats and the said pins.

2. A dove-tail mold pattern, consisting of a base portion having cleats with inclined outer edges, shells placed over the cleats, and springs between the cleats and the shells.

3. A dove-tail mold pattern, consisting of a base portion having cleats with inclined outer sides, steady pins at the outer edges of the cleats, shells with inclined outer edges placed between the cleats and the pins, and springs secured to the inner sides of the shells.

In testimony whereof I affix my signature in presence of two witnesses.

EDMUND KUHN.

Witnesses:
PETER STEIN,
CHAS. W. MARSH.